United States Patent [19]
Kubo et al.

[11] 3,742,357
[45] June 26, 1973

[54] NONCONTACT ELECTRIC APPARATUS FOR MAGNETICALLY MEASURING STRAINS

[75] Inventors: Moritada Kubo, Shibuya-ku, Tokyo; Kuniji Asano, Kawasaki-shi; Masao Obama, Kawasaki, all of Japan

[73] Assignee: Tokyo Shibaura Electric Co., Ltd., Kawasaki-shi, Japan

[22] Filed: Dec. 28, 1971

[21] Appl. No.: 213,133

[30] Foreign Application Priority Data
Dec. 28, 1970 Japan.............................. 45/119778
Sept. 1, 1971 Japan.............................. 45/67209

[52] U.S. Cl............................................ 324/34 ST
[51] Int. Cl............................................ G01r 33/12
[58] Field of Search ...................... 324/34 R, 34 ST; 11/11

[56] References Cited
UNITED STATES PATENTS
3,311,818  3/1967  Quittner......................... 324/34 ST

OTHER PUBLICATIONS
Dahm, J. R., On–Line Sensor Gages Shape of Strip Steel, Inst. Tech., May, 1970, pp. 54–59.

*Primary Examiner*—Robert J. Corcoran
*Attorney*—Solon B. Kemon et al.

[57] ABSTRACT

The apparatus of this invention includes a sensor unit having its substantially U-shaped core wound with primary and secondary coils and the ends of both legs of the core bridged by a nonmagnetic material wound with a leakage magnetic flux pickup coil. The sensor unit is disposed on one side of a magnetic or eddy current conductive sample with two opposite sides sufficiently close thereto for magnetic linkage. The primary coil of the sensor unit is magnetized by an A.C. source for controlling the electromotive force to be induced in the sample by magnetic fluxes passing through the sample from the sensor unit so as to keep it constant. Outputs from both secondary coil and leakage magnetic flux pickup coil of the sensor unit are supplied to a differential amplifier for producing output voltage corresponding to the varying magnetic flux passing through the sample by a difference between the two outputs. Output from the leakage magnetic flux pickup coil of the sensor unit and output proportionate to the voltage induced across the primary excited coil are impressed on a differential amplifier for producing output proportionate to magnetization current flowing through the sample by a difference between both outputs. Outputs from both differential amplifiers are supplied to a sampling circuit for detecting the varying coercive force conducted through the sample. Thus the apparatus is designed to detect by output from the sampling circuit variations in the mechanical stresses applied to the sample in the direction of the magnetic axis of the sensor unit, thereby measuring the amounts of strains occurring across the sample.

8 Claims, 21 Drawing Figures

NONCONTACT ELECTRIC APPARATUS FOR MAGNETICALLY MEASURING STRAINS

This invention relates to a noncontact electric apparatus for magnetically measuring strains in metal articles, such as an article which is conductive of, or sensitive to, a magnetic flux or eddy current.

It is known to the art that the permeability of magnetic materials such as iron, nickel and cobalt and alloys thereof generally varies substantially in proportion to the magnitude of mechanical stresses applied thereto, for example, tensile and compressive forces. It is also known that nonmagnetic conductive materials such as copper, aluminum and stainless steel which are capable of conducting an eddy current therethrough present, upon passage of such eddy current, a skin effect resembling a coercive force observed in magnetic materials.

With the aforementioned magnetic or nonmagnetic conductive materials, therefore, variations in the strains resulting from the stresses applied thereto may be expressed otherwise by changes in the magnetic permeability (in this invention, the coercive force in a hysteresis loop as later described) or skin effect.

The typical cases where it is necessary actually to measure strains occurring in the aforementioned metal materials included the field of rolling techniques used, for example, in an iron and steel plant where there is detected a tension distribution across rolled magnetic materials (actually a magnetic distribution across the width) such as steel strips desired to be rolled flat so as to control their momentary thickness and shape in the crosswise direction during rolling.

There will now be described for convenience the aforesaid field of rolling techniques by reference to concrete examples, though they are not intended to limit the scope of the invention.

Figure 1A:
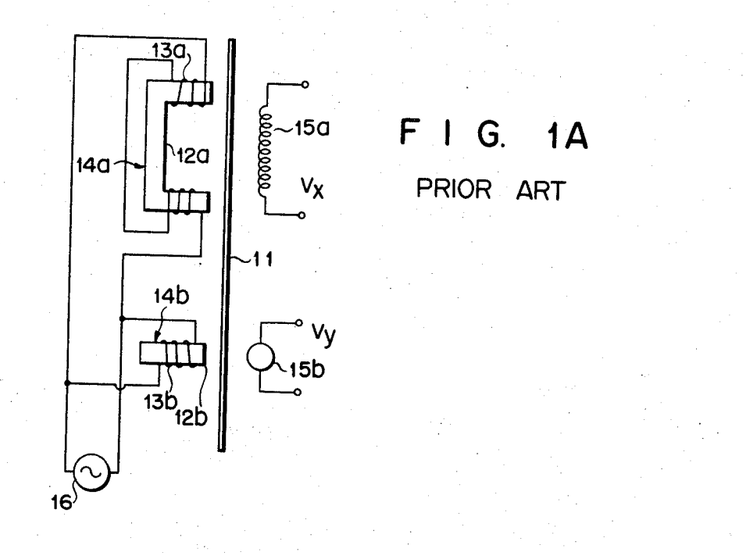
FIGS. 1A and 1B are the side and bottom views of a sensor unit of the conventional noncontact strain measuring apparatus.
Figure 1B:
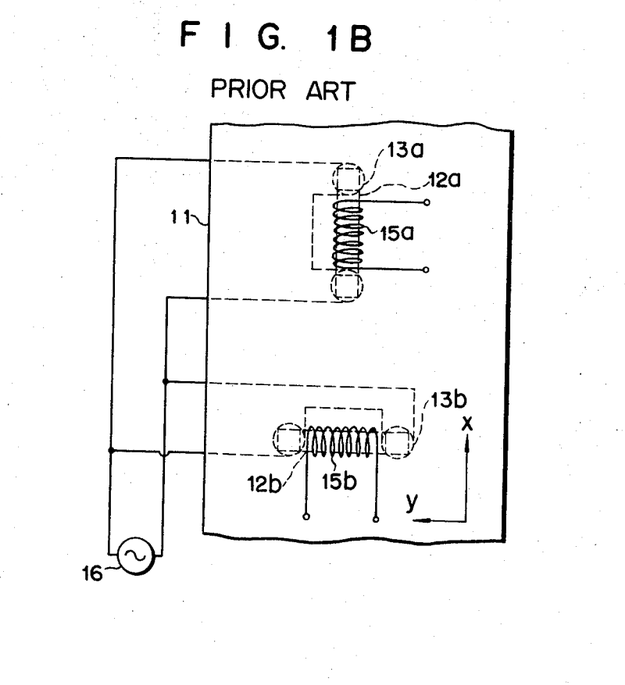

FIGS. 1A and 1B are the side and bottom views of a basic sensor unit 10 included in the conventional noncontact strain measuring apparatus known as the API system developed by the API Instruments Company, Chesterland, Ohio (clearly set forth in the U. S. Pat. No. 3,311,818) or the BISRA system proposed by the British Iron & Steel Research Association.

Referring to the FIGS. 1A and 1B, numeral 11 represents a magnetic sample such as a ferrous strip or plate, and the arrow $x$ denotes the rolling or tensile direction and the arrow $y$ the transverse or compressive direction.

Adjacent to one side of the sample 11 are disposed a pair of electromagnets 14a and 14b prepared by winding exciter coils 13a and 13b about substantially U-shaped iron cores 12a and 12b so as to have lines joining the respective open ends of the cores or the magnetic axes aligned with the aforesaid directions of $x$ and $y$. Further on the other side of the sample 11 are arranged, as shown in FIG. 1B, a pair of pickup coils 15a and 15b so as to face the electromagnets 14a and 14b with the magnetic axes of the pickup coils 15a and 15b horizontally aligned with those of the latter. The exciter coils 13a and 13b of the electromagnets 14a and 14b are connected to an A.C. source 16.

Now let it be assumed that the sample is magnetically isotropic and free from any mechanical stress. Then in the sensor unit 10 of the aforementioned arrangement, the sample 11 has the same magnetic permeability or reluctance in both $x$ and $y$ directions. Where, therefore, the exciter coils 13a and 13b of the electromagnets 14a and 14b are excited by the A.C. source 16, then the voltages V$x$ and V$y$ will have the same value which are impressed on the pickup coils 15a and 15b through the air gaps between the sample 11 and electromagnets 14a, 14b as well as through the air gaps between the sample 11 and pickup coils 15a, 15b.

When, under this condition, there is applied tension in the $x$ direction or compression in the $y$ direction, then the magnetic permeability of the sample 11 in the $x$ direction increases substantially in proportion to the tension or compression applied (that is, the reluctance proportionately decreases), whereas the magnetic permeability in the y direction is reduced inproportion to the tension or compression (namely, the reluctance proportionately increases).

The large density of a magnetic flux generated by the electromagnet 14a whose magnetic axis has been aligned with the $x$ direction so as to be linked through the sample 11 with the corresponding pickup coil 15a leads to an increase in the induced voltage V$x$ of the coil 15a. In contrast, the small density of a magnetic flux generated by the electromagnet 14b whose magnetic axis has been aligned with the $y$ direction so as to be linked through the sample 11 with the corresponding pickup coil 15b results in a decrease in the induced voltage V$y$ of the coil 15b.

Accordingly, the following functional equation results between the tension or compression T applied to the sample 11 and the induced voltages V$x$, V$y$ of the pickup coils 15a, 15b.

$$T = f(\text{V}x = \text{V}y) \tag{1}$$

The aforesaid API and BISRA systems are designed to measure by this principle the amounts of strains caused in an object by varying stresses applied thereto. However, the sensor unit 10 used in these systems has the drawback that even when the sample 11 receives the fixed amount of tension or compression, there occur variations in the induced voltage of the pickup coils 15a and 15b and consequently the results of determination, depending on the relative arrangement of the coils 15a and 15b, that is, the area of air gaps defined by the coils 15a and 15b with the sample 11. To avoid such difficulties, therefore, the air gaps should be fixed as much as possible, the allowable range of variation in the gaps being generally chosen to be ±1 millimeter.

In practice, however, it is not rare that a steel strip or plate continuously rolled at a feed speed of, for example, 1500 meters per minute presents variations of ±3 milimeters in the height at which it travels. Therefore, the prior art sensor unit 10 raises problems in connection with quality control in the rolling industry where an object of determination has to run particularly at such a high speed, and is little available for practical application. Further, the sensor unit 10 of the API and BISRA systems requires the electromagnets 14a and 14b taken as one group and pickup coils 15a and 15b taken as another group to be respectively disposed adjacent to each side of the object, possibly obstructing the operability and safety of rolling.

Quite recently, therefore, there has been developed a new system known as the J and L system arranged as described later to eliminate the shortcomings encountered with the aforementioned API and BISRA systems. (The J and L systems has been designed by Jones & Laughlin's Graham Research Laboratory, Pittsburgh, Pa. and detailed in "Measurement of shape on Double-reduced Tin Plate" published in the 20th ISA Conference on Instrumentation in the Iron & Steel Industry, Mar. 23–25, 1970.)

Figure 2A:
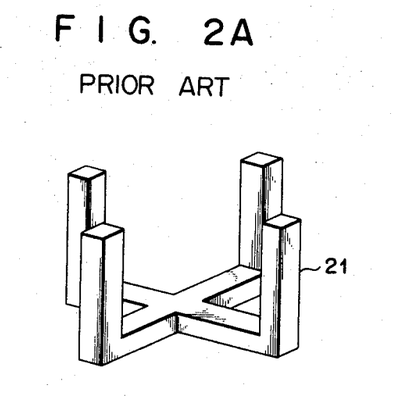
FIG. 2A is a perspective view of a core constituting the sensor unit of another prior art noncontact strain measuring apparatus.

FIG. 2A is a perspective view of a four-legged or cross-shaped (permissibly three-legged on principle) iron core 21 used in the J and L system and arranged so that the four equally spaced legs define two pairs of vertical planes which intersect in a right angle and the top surfaces of its four legs define a horizontal plane.

Figure 2B:
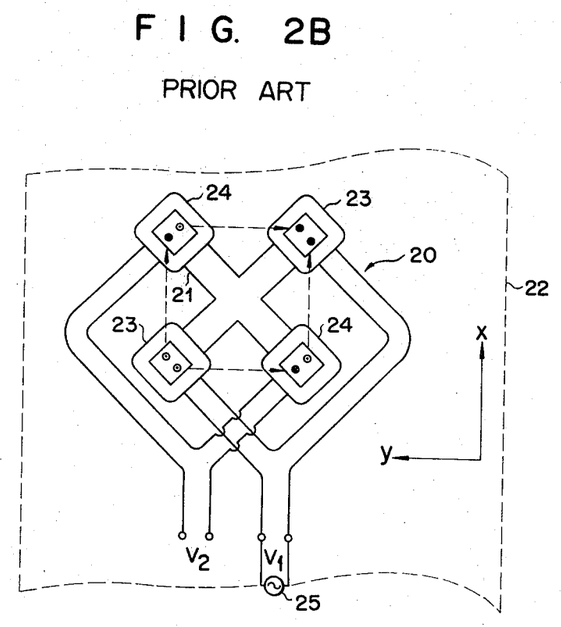
FIG. 2B is a plan view of a sensor unit prepared by winding primary and secondary coils about the core of FIG. 2A where the unit is disposed beneath an object.

FIG. 2B is a plan view of a sensor unit 20 consisting of an electromagnet prepared by winding, as later described, primary and secondary windings about the four legs of the core 21, where the sensor unit 20 is disposed beneath a sample 22 such as a steel strip or plate being rolled in such a manner that the air gaps G between the top surfaces of the four legs and the sample 22 are uniform and small compared to the spacing between the legs, with the vertical planes defined by the adjacent legs extending in the $x$ or tensile direction and $y$ or compressive direction.

Of the four legs of the core 21, one pair of linearly connected legs are wound with identical primary windings 23 and the other pair of linearly connected legs are wound with identical secondary windings 24. The primary windings 23 are connected in series to an A.C. source 25 so that current flow is in the directions shown. The current in each primary winding 23 of the core 21 forms, relative to each secondary winding 24, a pair of equivalent magnetic flux loops intersecting each other in opposite directions through the respective air gap G and sample 22 as shown by the broken line. Thus current flows through the secondary windings 24 in the directions indicated.

The sensor unit 20 of aforesaid aforesiad arrangement forms an equivalent magnetic flux loop to that of the sensor unit 10 of FIGS. 1A and 1B with respect to the sample 22. Obviously, therefore, secondary voltage $V_2$ induced at both ends of each of the secondary windings 24 (corresponding to the pickup coils 15a and 15b of FIG. 1) is detected, as shown by the following equation, as a function of a tensile or compressive force T applied to the sample 22 and the air gap G defined by the core 21 with the sample 22.

$$V_2 = f(G, T)$$

(2)

Where the primary windings 23 (corresponding to the exciter coils 13a and 13b of FIG. 1) are excited by an A.C. source (which should be a constant current source in terms of an effective value), then the primary voltage $V_1$ induced at both ends of each of the primary windings 23 is detected, as in the case of the above-mentioned induced secondary voltage $V_2$, as a function of a tensile or compressive force T applied to the sample 22 and the air gap G defined by the core 21 with the sample 22.

$$V_1 = g(G, T)$$

(3)

Therefore the J & L system is so designed that the primary voltage $V_1$ of the equation (3) above is impressed on a properly arranged nonlinear circuit and the resultant output is added to the value of the secondary voltage of the equation (2) above to obtain a relationship.

$$V = V_2 + K_u \cdot V_1$$

(4)

and the value of $K_u$ of this equation (4) is so chosen as to obtain a functional equation.

$$V = f(T)$$

(5)

from which the V of the equation (4) above is determined as a function of only a tensile or compressive force applied to the sample 22, thereby eliminating the effect of the air gap G.

However, the above-mentioned sensor unit 20 of the J and L system requires its core 21 to be formed in a relatively complicated form (that is, a three - or four - leg type) and moreover is originally not intended to avoid the effect of the air gaps G, but is designed simply offset such effect by making corrections using a complicated nonlinear amplifier so as cause both primary and secondary electromotive forces $V_1$ and $V_2$ to present the same degree of variation resulting from the effect of the air gaps. Accordingly, the range of such correction is naturally limited (it is experimentally shown that the effect of the air gap G can be easily offset by making corrections falling within the range of ±2.5 millimeters). This means that the J & L system is still subject to the effect of the air gaps between the sensor unit and the object as is the case with the API and BISRA systems.

Figure 3:
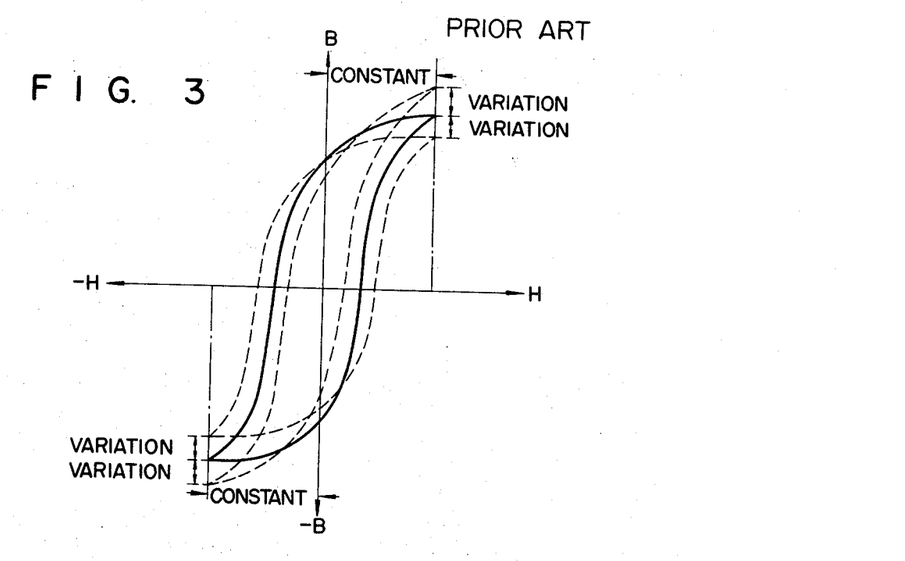
FIG. 3 shows hysteresis loops illustrating the measuring principle of the sensor unit of FIGS. 2A and 2B.

Considering from a hysteresis loop to be induced in such a sample, the sensor unit of, for example, J & L system is so designed as to detect, as shown in the coordinate diagram of FIG. 3, variations in the secondary electromotive force (or density of a magnetic flux) B of the ordinate induced in the object under the condition in which the magnetic current (or magnetic field) H plotted on the abscissa is kept constant (in terms of an effective value), thereby determining the amounts of strain sustained by the object under the tensile or compressive force applied thereto. Experiments of the present inventors also show that the accuracy of determination by the sensor unit of such prior art systems is necessarily subject to the effect of varying air gaps defined by the sensor unit with the object.

It is accordingly the object of this invention to provide a noncontact strain measuring electric apparatus using a novel type of sensor unit, which detects variations in the coercive force of an object with a secondary electromotive force therein kept constant, thereby enabling the amounts of strains sustained by the object under varying stresses such as a tensile or compressive force applied thereto to be determined very accurately under a condition originally free from the effect of air gaps between the sensor unit and object.

According to this invention, there is provided a noncontact electric apparatus for magnetically measuring strains in a magnetic or eddy current conductive material with two opposite sides comprising a sensor unit having its core wound with primary and secondary coils and provided with a leakage magnetic flux pickup coil so positioned as to pickup a leakage magnetic flux from the core; means for locating the sensor unit on one side of the sample sufficiently close thereto for magnetic linkage with the magnetic axes of said sensor unit aligned with the directions in which there are applied mechanical stress to the sample; a differential amplifier having two inputs supplied with outputs from the secondary coil and leakage magnetic flux pickup coil of said sensor unit; a second differential amplifier having two inputs supplied with rectified output from said first differential amplifier and output from a D.C. source having a preset referential voltage; an A.C. source of variable amplitude connected between the output of said second differential amplifier and the primary coil of the sensor unit to supply excitation current to the primary coil; a third differential amplifier having two inputs supplied with output voltage from a voltage source for generating a voltage proportionate to the excitation current passing through the primary coil of the sensor unit and also with output voltage from the leakage magnetic flux pickup coil; and a sampling circuit supplied with outputs from said second and third differential amplifiers and drawing out the variation of coercive force to be induced in the sample corresponding to the zero value of a magnetic flux linked through the sample from said sensor unit.

The present invention can be more fully understood from the following detailed description when taken in connection with reference to the accompanying drawings, in which.

Figure 4:
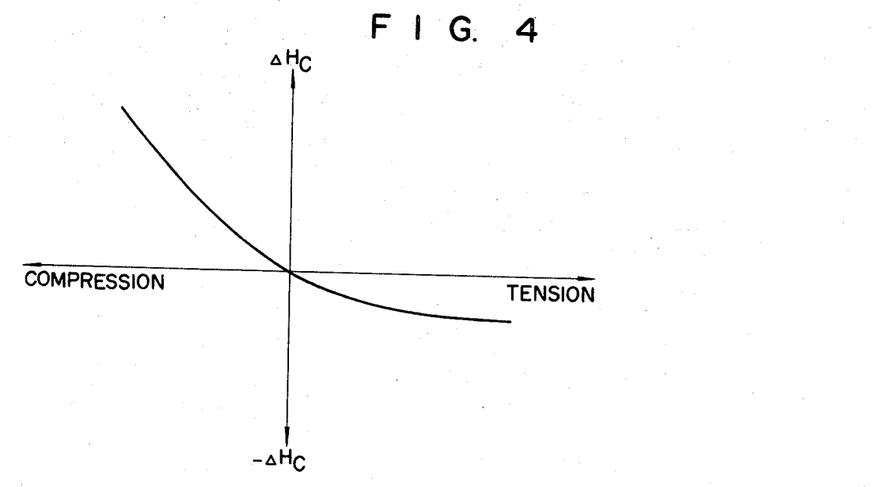
FIG. 4 is a curve diagram showing variations in the coercive force of an object as against the mechanical stress applied thereto and FIG. 5 indicates hysteresis loops associated with the coersive force, both figures being given to illustrate the measuring principle of the sensor unit of this invention.

Before referring to the individual embodiments of this invention, there is described its principle in which there are measured the amounts of strains sustained by an object of magnetic metal material such as a travelling steel strip for rolling under varying tension applied thereto in the direction in which it is rolled. Where such object of magnetic material is brought to a position affected by a magnetic field, variations $\Delta Hc$ and $-\Delta Hc$ of the coercive force of said object as against the tension and compression applied thereto may be indicated by the curve of FIG. 4 as known to the art.

Figure 5:
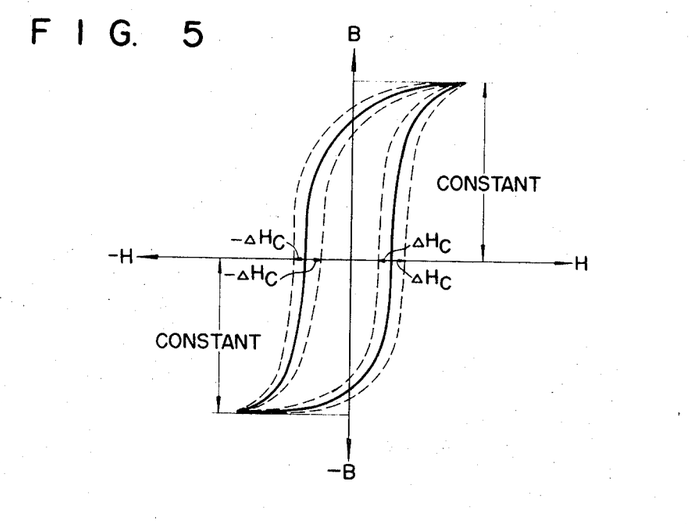

Accordingly, this invention is intended to measure the amounts of strains sustained by an object under varying tension and/or compression applied thereto by detecting variations $\Delta Hc$ and $-\Delta Hc$ of the coercive force of the object under the condition where the density of a magnetic flux or secondary electromotive force B in the hysteresis loops of FIG. 5 as plotted on the ordinate is kept constant, (the coercive force is represented by the intensity H of a magnetic field plotted on the abscissa with the density of a magnetic flux taken to be zero).

Figure 6:
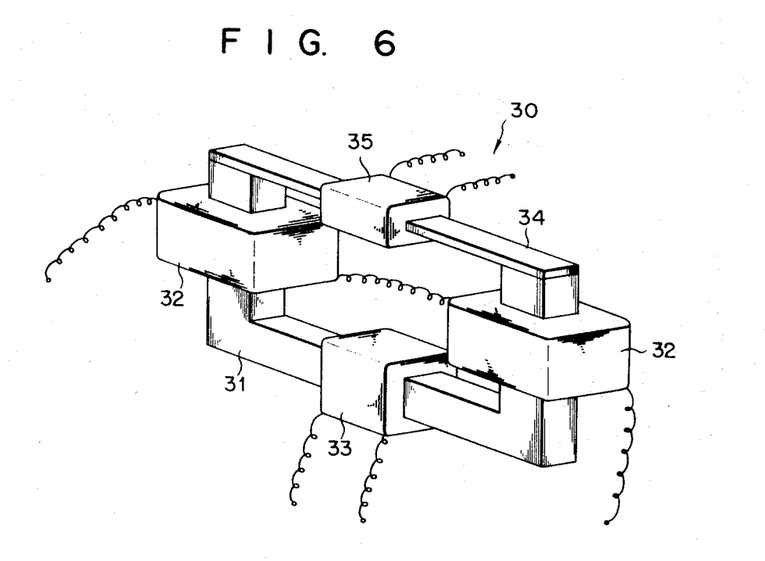
FIG. 6 is a perspective view of a sensor unit preferably arranged according to this invention.
Figure 7A:
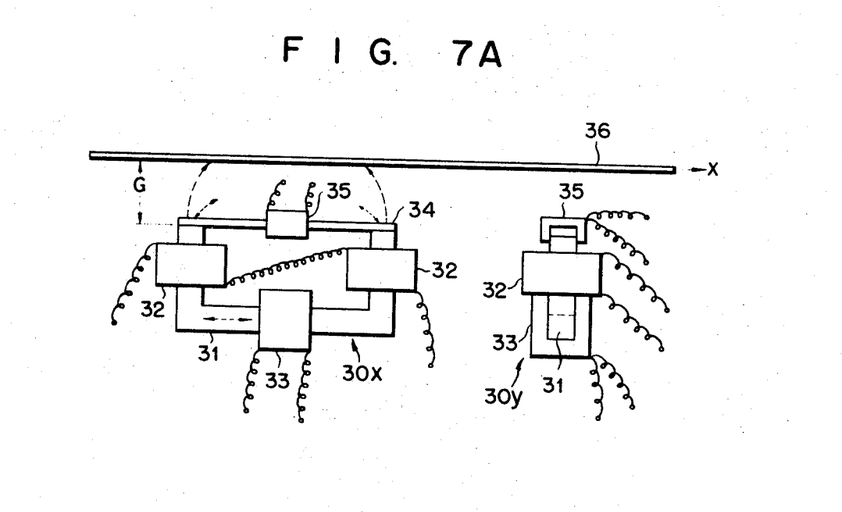
FIGS. 7A and 7B are side and top views of such sensor units as shown in FIG. 6 where they are arranged in practical application.
Figure 7B:
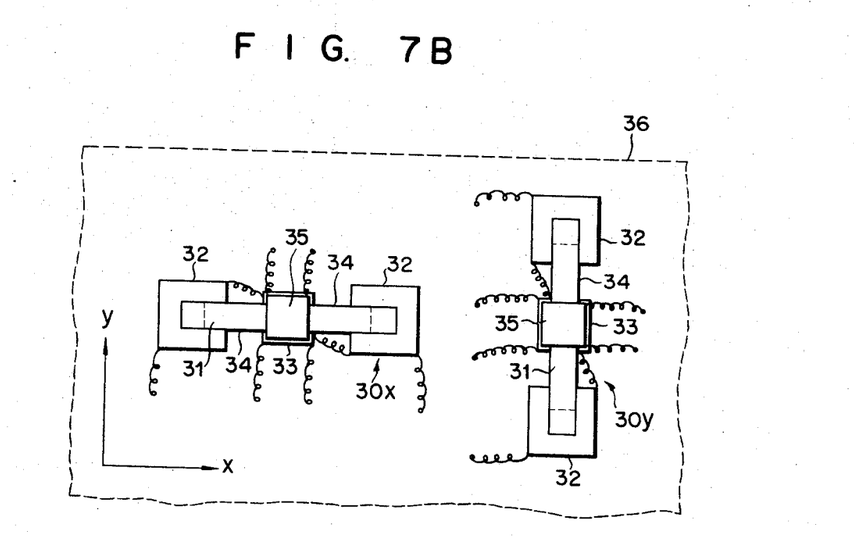

There will now be described a noncontact strain measuring apparatus according to the preferred embodiments of this invention based on the above mentioned principle. FIG. 6 is a perspective view of a sensor unit according to this invention. Both leg portions of a substantially U-shaped iron core 31 are wound with primary coils 32 connected in series, and the intermediate portion of the core 31 between both leg portions is wound at the center with a secondary coil 33. Across the ends of both leg portions of the U-shaped core 31 is bridged a nonmagnetic material 34 such as bakelite which is wound with the later described coil 35 for detecting a leakage magnetic flux. Thus is formed the sensor unit 30 of this invention. There are arranged parallel as illustrated in FIGS. 7A and 7B a pair of sensor units 30x and 30y in such a manner that the plane connecting the ends of both leg portions of each of the sensor units 30x and 30y defines a certain air gap G with the underside of an object of magnetic metal material such as a travelling iron strip for rolling in so far as a magnetic flux can be linked therethrough. In this case, the magnetic axis of one sensor unit 30x is aligned with the direction in which the object is rolled or subject to tension as indicated by the arrow x, while the other sensor unit 30y is so positioned as to have the center of its magnetic axis located on the exten-sion of the magnetic axis of the former sensor unit 30x which lies in the x direction. In practice, several pairs of sensor units 30x and 30y are arranged at a prescribed space across a sample 36 (FIG. 7). In this case, each pair is arranged in exactly the same way with respect to the sample 36 and the circuits associated with the sensor units 30x and 30y of the individual pairs disposed in the x and y directions have the same arrangement. For convenience of further description, therefore, there will now be described a noncontact strain measuring apparatus according to an embodiment of this invention by reference to the circuit arrangement and operation associated with the sensor unit 30x of only one pair illustrated in FIG. 8. The primary coil 32 of the sensor unit 30x is connected at one end to the output of a differential amplifier 42 through the later described A.C. source 41 of variable amplitude, and grounded at the other end through a resistor 43. It is also possible to directly ground the primary coil 32 of the sensor unit 30x at one end and connected it at the other end to the output of the differential amplifier 42 through the amplitude variable A.C. source 41.

Figure 8:
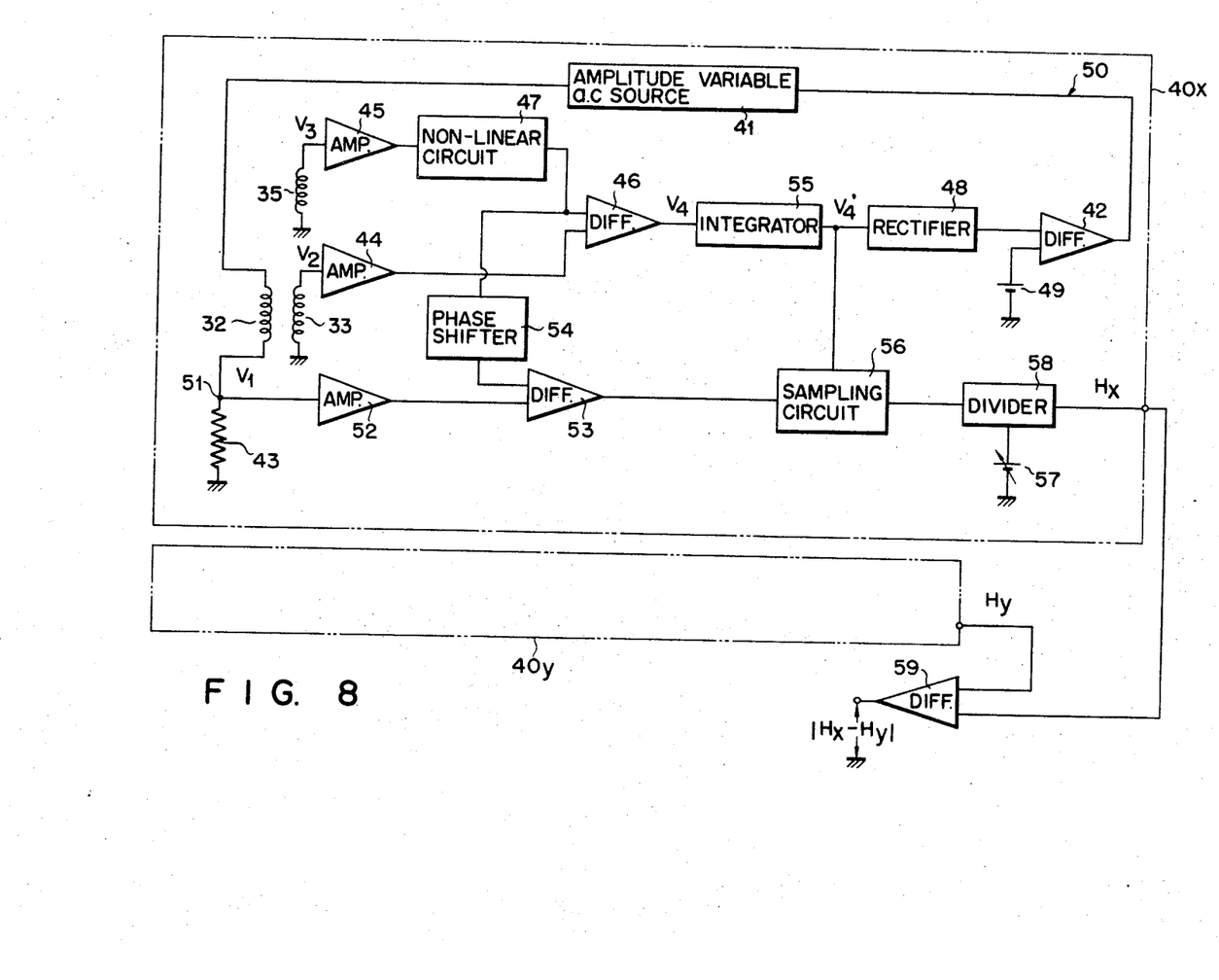
FIG. 8 is a block diagram of a noncontact strain measuring apparatus according to an embodiment of this invention wherein the sensor units are arranged as shown in FIGS. 7A and 7B with respect to the object.

The secondary coil 33 and leakage magnetic flux pickup coil 35 of the sensor unit 30x are grounded at one end and connected at the other end to both inputs of a differential amplifier 46 through amplifiers 44 and 45 respectively. In this case, a nonlinear amplifier 47 is connected between the output of either of the amplifiers 44, 45 and the corresponding input of the differential amplifier 46, if required for the later described arrangement. The output of the differential amplifier 46 is connected through a rectifier 48 to one of two inputs of the differential amplifier 42, the other input of which is grounded through a reference D.C. source 49.

Figure 9:
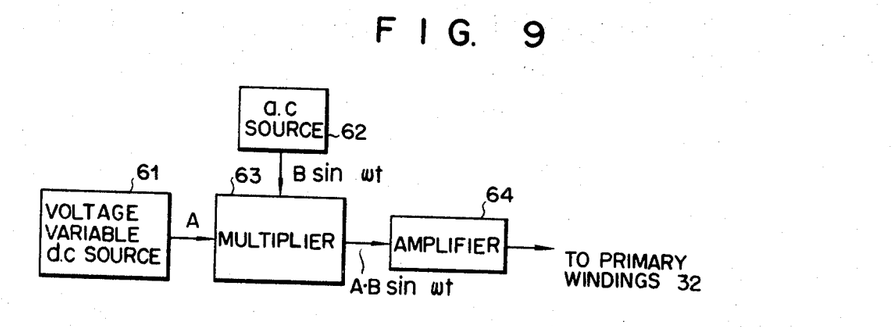
FIG. 9 shows in block form and arrangement of the amplitude variable A.C. source 41 of FIG. 8.

FIG. 9 is a block diagram of the A.C. source 41 of variable amplitude. According to this circuit arrangement, there are supplied to a multiplier 63 output voltage A from a D.C. source 61 of variable voltage constituted by output voltage from the differential amplifier 42 and output voltage $B \sin \omega t$ from an A.C. source 62 of constant amplitude ($\omega$ is taken to be equal to $2\pi f$ and the source frequency is preferred to be 1 KHz). Thus, the A.C. voltage of variable amplitude obtained from the multiplier 63 is supplied through an amplifier 64 provided, if required (this voltage may be expressed as output voltage $A \cdot B \sin \omega t$ if the degree of amplification by the amplifier 64 is not taken into account) to the primary coil 32 of the sensor unit 30x.

When the primary coil 32 of the sensor unit 30x is excited by the A.C. source 41 of variable amplitude, then there is generated through the core 31 a magnetic flux $\phi_1$ in an amount proportionate to the voltage thus excited. This magnetic flux $\phi_1$ may be expressed as a sum of a fraction $\phi_3$ leaking through the air and another fraction $\phi_2$ passing through the sample 36 in the $x$ direction. Accordingly, there results the following equation:

$$\phi_2 = \phi_1 - \phi_3$$

(6)

Across both ends of the secondary coil 33 is induced voltage $V_2$ proportionate to the magnetic flux $\phi_1$, and across both ends of the leakage magnetic flux pickup coil 35 is induced voltage $V_3$ proportionate to the leakage fraction $\phi_3$ of the magnetic flux $\phi_1$.

Accordingly, output voltage $V_4$ from the differential amplifier 46 which represents a difference between the induced voltages $V_2$ and $V_3$ has a level substantially proportionate to that of the fractional magnetic flux $\phi_2$ passing through the sample 36 in the $x$ direction. The output voltage $V_4$ from the differential amplifier 46 is conducted through the rectifier 48 to one of the two inputs of the differential amplifier 42, the other input of which is connected to the referential D.C. source 49. Therefore output voltage from the latter differential amplifier 42 represents a difference between the voltage level of the reference D.C. source 49 and that of the rectifier output from the former differential amplifier 46. Variations in the air gap G between the sensor unit 30x and sample 36 result in changes in the electromagnetic force to be induced in the sample 36 by the fractional magnetic flux $\phi_2$ passing through the sample 36 in the $x$ direction. Under these conditions a closed loop 50 consisting of the A.C. source 41 of variable amplitude, primary coil 32, differential amplifier 46 (whose two inputs are impressed with outputs from the secondary coil 32 and leakage magnetic flux pickup coil 35 respectively), rectifier 48, differential amplifier 42 and back to the A.C. source 41 of variable amplitude, forms a negative feedback loop which adjusts the output from the A.C. source 41 of variable amplitude. In other words, the amount of excitation current supplied from the source 41 to the primary coil 32 always fixes the output voltage $V_4$ from the differential amplifier 46 corresponding to the electromagnetic force to be induced in the sample 36 by said magnetic flux $\phi_2$.

Figure 10A:
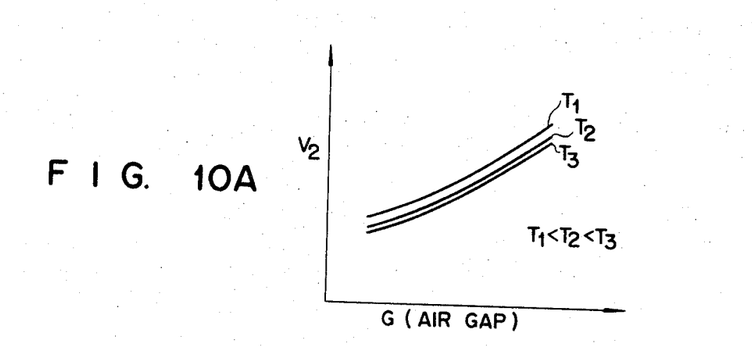
FIG. 10A is a curve diagram of output from the amplifier 44 of FIG. 8.
Figure 10B:
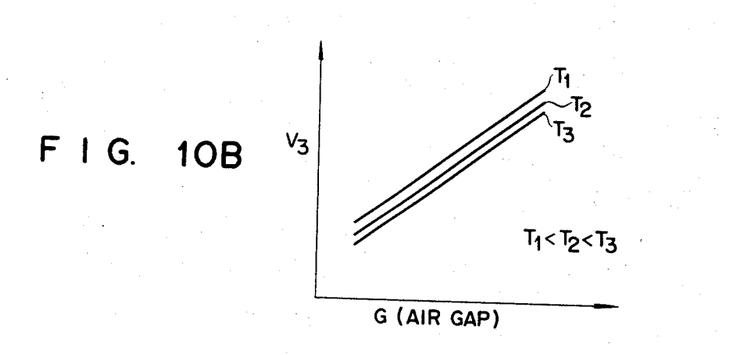
FIG. 10B is a curve diagram of output from the amplifier 45 of FIG. 8.

FIG. 10A is a curve diagram showing changes in output voltage from the amplifier 44, where there occur variations in the air gap G between the sensor unit 30x and sample 36 as well as in the tensile forces $T_1$, $T_2$ and $T_3$ applied to the sample 36 in the $x$ direction. With the expansion of the air gap G, there are supplied larger amounts of excitation current from the A.C. source 41 of variable amplitude to the primary coil 32 through the aforementioned negative feedback loop 50. This means that as the air gap G broadens, output from the amplifier 44 increases. Further, the stronger the tension applied to the sample 36 in the $x$ direction, the higher the magnetic permeability presented by the sample 36 thus stressed. To fix, therefore, the electromotive force induced by the fractional magnetic flux $\phi_2$ passing through the sample 36, output voltage from the amplifier 44 decreases in inverse proportion to the magnitude of the tension applied. FIG. 10B is similarly a curve diagram showing changes in output voltage from the amplifier 45, where there occur variations in the air gap G between the sensor unit 30x and sample 36 as well as in the tensile forces $T_1$, $T_2$ and $T_3$ applied to the sample 36 in the $x$ direction.

As apparent from FIGS. 10A and 10B, output voltages from the amplifiers 44 and 45 do not change in an exactly corresponding degree to variations in the air gap G between the sensor unit 30x and sample 36 as well as in the tensile forces applied to the sample 36. Therefore, it has been experimentally found that where there is determined by a difference between output voltages from the amplifiers 44 and 45 the amount of induced voltage $V_4$ from the differential amplifier 46 corresponding to the electromotive force being induced in the sample 36 by the fractional magnetic flux $\phi_2$ passing through the sample 36 in the $x$ direction, said determination is somewhat reduced in accuracy. It has been further found that to elevate the accuracy of said determination, it is preferred to cause outputs from the amplifiers 44 and 45 to change in exactly the same degree with variations in the air gap G between the sensor unit 30x and sample 36 as well as in the tensile forces applied to the sample 36 by conducting output from the amplifier 45 through the nonlinear circuit 47.

On the other hand, there is drawn out from the junction of the primary coil 32 with the resistor 43 a voltage $V_1$ proportionate to the voltage impressed across both ends of the resistor 43, that is, the amount of excitation current supplied from the source 41 to the primary coil 32. After passing through an amplifier 52, said voltage $V_1$ is supplied to one of the two inputs of a differential amplifier 53, the other input of which is supplied with a voltage proportionate to the leakage magnetic flux $\phi_3$ picked up by the coil 35 from the output of the amplifier 45 through a phase shifter 54 provided, if required to equalize the phases of output signals from the amplifiers 52 and 45. Accordingly, output from the differential amplifier 53 corresponds to the amount of magnetization current $i \phi_2$ proportionate to the varying fractional magnetic flux $\phi_2$ passing through the sample 36 in the x direction, where there is controlled the amount of excitation current supplied from the source 41 to the primary coil 32 so as to fix an electromotive force generated by the fractional magnetic flux $\phi_2$.

Figure 11:
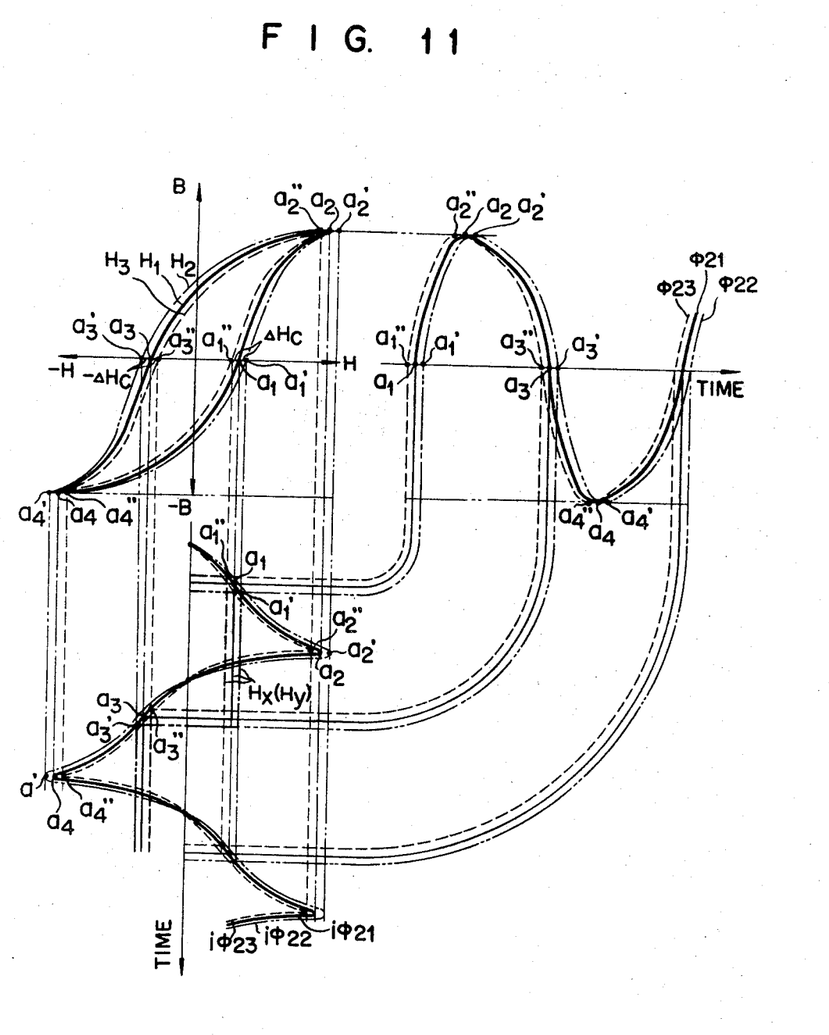
FIG. 11 indicates wave forms illustrating the operation of the sampling circuit 56 of FIG. 8.

In the sample 36 are formed the hysteresis loops $H_1$, $H_2$, $H_3$ – of FIG. 11 by various fractional magnetic fluxes $\phi_{21}$, $\phi_{22}$, $\phi_{23}$ – and magnetization currents $i\phi_{21}$, $i\phi_{22}$, $i\phi_{23}$ – corresponding thereto. If, in case the fractional magnetic fluxes $\phi_{21}$, $\phi_{22}$, $\phi_{23}$ – corresponding to output voltage $V_4$ from the differential amplifier 46 have a density of zero, (In this case output voltage $V_4$ from the differential amplifier 46 has a maximum value. If, therefore, the output of the amplifier 46 is fitted with an integrator 55 as shown in FIG. 8, then said maximum amount can be made to match a zero output from the integrator 55. FIG. 11 represents the case where the integrator 55 is fitted) there are detected by a sampling circuit 56 the values of magnetization currents $i\phi_{21}$, $i\phi_{22}$, $i\phi_{23}$ – corresponding to output from the differential amplifier 53, then there can be detected from the sampling circuit 56 variations $\Delta Hc$ and $-\Delta Hc$ the coercive force in the sample 36 corresponding to the changing tension T applied thereto in the x direction. Since there exists the relationship of FIG. 4 between the coercive force and tension T, variations in said tension T can be detected from the sampling circuit 56.

Next, output from the sampling circuit 56 is supplied to the input of a divider 58 connected with a referential voltage source 57 having a proper referential voltage corresponding to, for example, the coercive force in the sample 36 when the tension applied thereto in the x direction is zero, so as to be divided by the voltage of the referential voltage source 57. Thus there can be detected from the divider 58 a divided value Hx of the varying coercive force in the sample 36 determined by the sampling circuit 56 when the tension applied to the sample 36 in the x direction is zero.

Figure 12A:
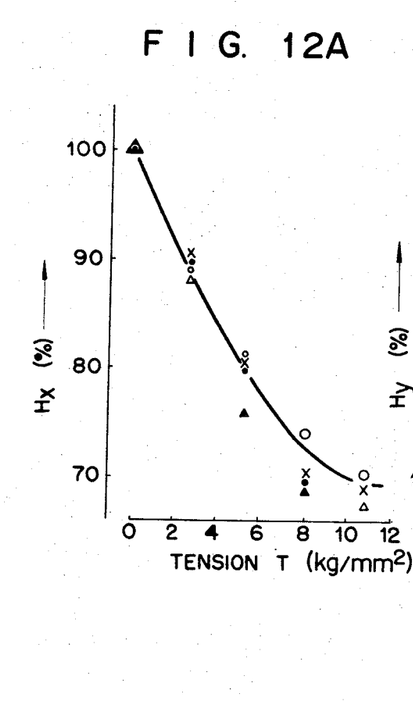
FIG. 12A is a curve diagram of output from the circuitry 40x of FIG. 8.

FIG. 12A is a curve diagram showing outputs from the divider 58 determined in the aforementioned manner. The curve denotes the values of the outputs measured when the air gap G between the sensor unit 30x and sample 36 indicated about 6 mm, 8 mm, 10 mm and 12 mm respectively. As apparent from FIG. 12A, the divided value Hx of the varying coercive force in the sample 36 obtained from the divider 58 presents a relatively larger variation while the tension T applied to the sample 36 in the x direction remains small and conversely a relatively small variation, in case a greater tension T is applied. The divided value Hx varies nonlinearly with the tension T substantially independently of changes in the air gap G. Therefore, there results the following functional equation:

$$Hx = h(T)$$

(7)

Figure 13:
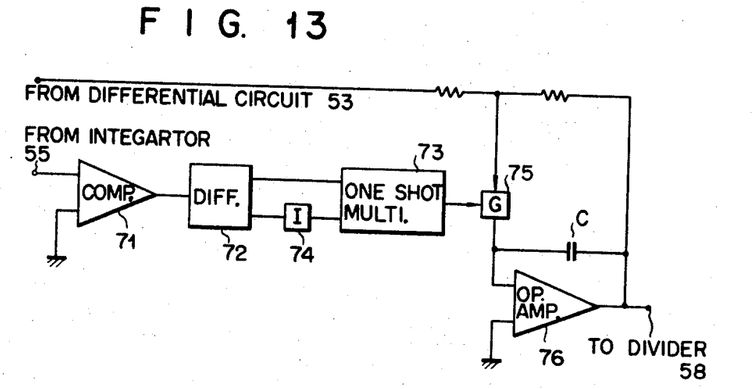
FIG. 13 shows a concrete circuit arrangement of the sampling circuit 56 of FIG. 8.

FIG. 13 illustrates a concrete circuit arrangement of the aforementioned sampling circuit 56. Output voltage $V'_4$ from the integrator 55 is impressed on a differentiation circuit 72 through a comparator 71 for detecting the zero value of the voltage $V'_4$ (or for detecting the maximum value of the voltage $V_4$ when there is used output voltage $V_4$ from the differential amplifier 46). Since the positive and negative halves of the respective outputs from the differentiation circuit 72 alternately appear periodically, either of these halves, for example, the positive half is directly impressed on a one-shot multivibrator 73, whereas the other negative half is supplied to the one-shot multivibrator 73 through an inverter 74. Under such arrangement, the multivibrator 73 produces pulses corresponding to the zero value of output voltage $V'_4$ from the integrator 55. Pulses from the multivibrator 73 are supplied to a gate circuit 75 so as to gate output voltage from the differential amplifier 53. Output from the gate the gate 75 is conducted to an operational amplifier 76 having a capacitor C connected between its input and output. From the amplifier 76, therefore, there can be detected output voltage from the differential amplifier 53 corresponding to the zero value of output voltage $V'_4$ from the integrator 55, thus attaining the desired object.

Figure 12B:
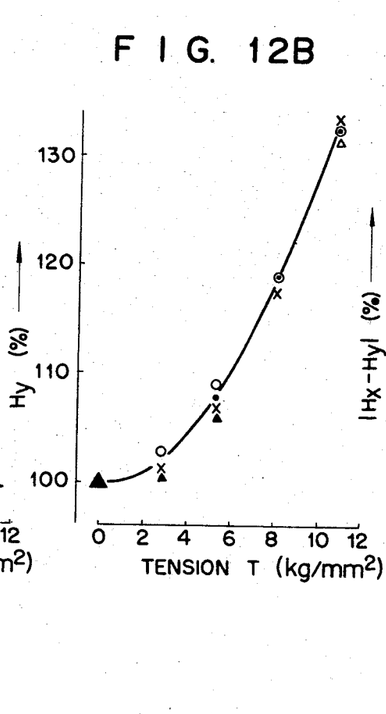
FIG. 12B is a curve diagram of output from the circuitry 40y of FIG. 8.
Figure 12C:
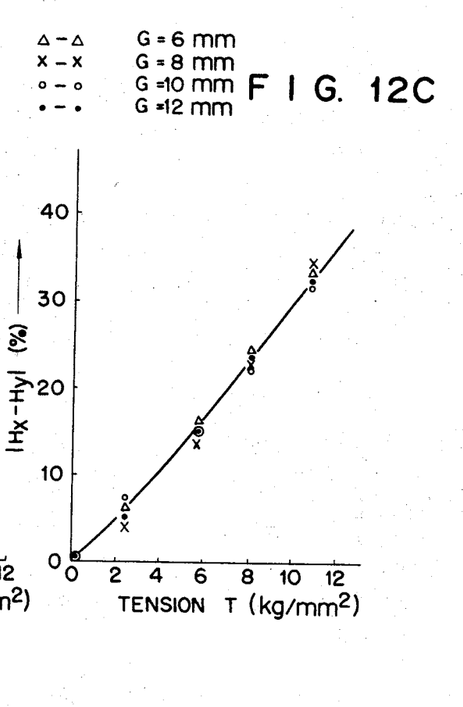
FIG. 12C is a curve diagram of output from the differential amplifier 59 of FIG. 8.

FIG. 12B indicates the divided value Hy of the coercive force in the sample 36 varying in the y direction correspondingly to a compressive force applied thereto in the y direction, said divided value Hy being detected by a circuitry 40y having the same arrangement of the aforementioned circuitry 40x. As apparent from the foregoing description, said divided value Hy can be detected substantially independently of the air gap G between the sensor unit 30y and the sample 36. It will be noted, however, that conversely from the case of Hx of the equation (7) above, said Hy varies in a relatively small degree while there is applied a small tension T, but more prominently when there is applied a greater tension T. Where, therefore, outputs from both circuitries 40x and 40y are conducted through a differential amplifier 59, then there can be obtained output $|Hx - Hy|$ from the differential circuit 59 in the form converted to an amount substantially linearly proportionate to the magnitude of the tension T applied as illustrated in FIG. 12C, thus offering the advantage of elevating the accuracy of determination.

Figure 14:
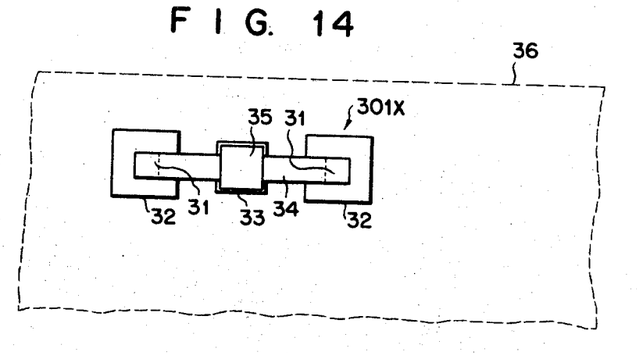
FIGS. 14 and 15 are top views of sensor units according to other embodiments of the invention, where their positions are changed with respect to an object of determination.
Figure 15:
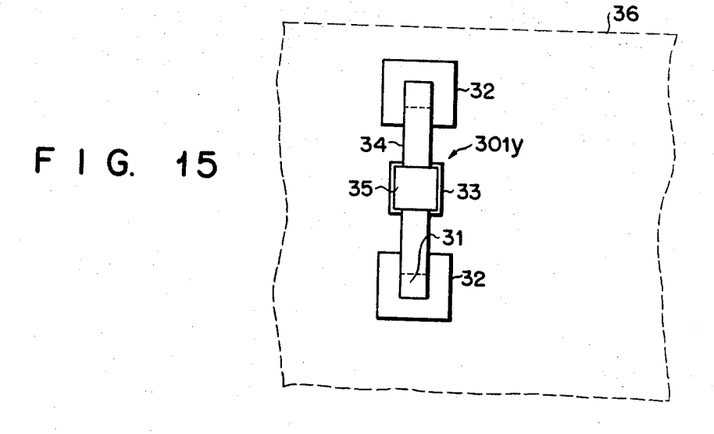

In the foregoing embodiment, a pair of sensor units 30x and 30y were disposed beneath the sample 36 in the tensile direction x and compressive direction y respectively. As illustrated in FIG. 14, however, it is possible to provide only a sensor unit 301x with its magnetic axis aligned with the tensile direction x or to fit, as shown in FIG. 15, only a sensor unit 301y with its magnetic axis aligned with the compressive direction y. Obviously, even this arrangement can be operated with the same effect as in the preceding embodiment. It will be noted, however, that such arrangement results in a slight decline in the accuracy of determination, though the number of sensor units may be reduced by half.

What we claim is:

1. A noncontact type electric apparatus for magnetically measuring strains in a magnetic or eddy current conductive sample with two opposite sides comprising:
  at least one sensor unit which includes a magnetic core provided with at least two legs and wound with primary and secondary coils and a leakage magnetic flux pickup coil wound around a nonmagnetic member bridging the open ends of the core legs to pick up that leakage component of a magnetic flux generated from said sensor unit which passes through an air gap between the sample and said sensor unit;

means for locating said sensor unit on one side of the sample sufficiently close thereto for magnetic linkage to produce a magnetic flux which extends therethrough in a first direction; and a first differential amplifier having its two inputs supplied with outputs from said secondary coil and the leakage magnetic flux pickup coil of said sensor unit; and a second differential amplifier having its two inputs supplied with a rectified output from said first differential amplifier and an output from a preset D.C. reference voltage source;

an A.C. source of variable amplitude connected between the output of said second differential amplifier and the primary coil of said sensor unit to supply excitation current to said primary coil;

a third differential amplifier having its two inputs supplied with an output voltage from a voltage source for generating a voltage proportionate to the excitation current passing through said primary coil of said sensor unit and also with an output voltage from said leakage magnetic flux pickup coil thereof; and a sampling circuit for sampling output signals from said third differential amplifier under control of sampling signals consisting of output signals from said first differential amplifier.

2. An apparatus according to claim 1, wherein at least one divider is provided on the output side of said sampling circuit for dividing the output voltage from said sampling circuit by a D.C. voltage corresponding to an output from said sampling circuit when the sample is not under any mechanical stress.

3. An apparatus according to claim 1, wherein there are two sensor units, one being arranged to generate a magnetic flux in the first direction and the other being arranged to generate a magnetic flux in a second direction substantially transverse to said first direction.

4. An apparatus according to claim 1, wherein a nonlinear circuit is connected between the output terminal of the leakage magnetic flux pickup coil of said sensor unit and said first differential amplifier to enable both input voltages of said first differential amplifier to present the same variation characteristics with respect to variations in a mechanical stress applied to the sample as well as in the air gap between the sample and said sensor unit.

5. An apparatus according to claim 1, wherein said A.C. source of variable amplitude comprises a multiplier for multiplying an output from said second differential amplifier with an output from an A.C. source of constant amplitude.

6. An apparatus according to claim 1, wherein said sampling circuit comprises a sampling pulse generating circuit including a comparator impressed with an output from said first differential amplifier, a differentiation circuit supplied with an output from said comparator, and a one-shot multivibrator connected to an output from said differentiation circuit; a gate circuit for gating an output from said third differential amplifier by sampling pulses generated by said sampling pulse generating circuit; and an operational amplifier having a capacitor connected between the input and output terminals thereof and connected to an output from said gate circuit.

7. An apparatus according to claim 2, wherein there are two sensor units and signal processing circuits, one being arranged to generate a magnetic flux in the first direction and the other being arranged to generate magnetic flux in a second direction substantially transverse to said first direction, a second divider being provided with said second sensor unit, and wherein there is further provided a fourth differential amplifier having its two inputs supplied with both outputs from said dividers.

8. An apparatus according to claim 1 wherein said core of the sensor unit has a substantially U-shaped and the leakage magnetic flux pickup coil is wound about a nonmagnetic material bridged across the ends of the two legs of said core.

* * * * *